US011599512B1

(12) United States Patent
Liu

(10) Patent No.: US 11,599,512 B1
(45) Date of Patent: Mar. 7, 2023

(54) SCHEMA INFERENCE FOR FILES

(71) Applicant: Snowflake Inc., Bozeman, MT (US)

(72) Inventor: Yucan Liu, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/938,401

(22) Filed: Oct. 6, 2022

(51) Int. Cl.
*G06F 16/21* (2019.01)
*G06F 16/25* (2019.01)
*G06F 16/22* (2019.01)

(52) U.S. Cl.
CPC .......... *G06F 16/212* (2019.01); *G06F 16/221* (2019.01); *G06F 16/258* (2019.01)

(58) Field of Classification Search
CPC .... G06F 16/212; G06F 16/221; G06F 16/258; G06F 16/1794
USPC .......................................................... 707/755
See application file for complete search history.

(56) References Cited

U.S. PATENT DOCUMENTS

| 10,255,302 B1* | 4/2019 | Cosic | G06F 3/0481 |
| 2006/0022048 A1* | 2/2006 | Johnson | G06Q 10/025 |
| | | | 707/E17.117 |
| 2007/0174331 A1* | 7/2007 | Wolf | G06F 16/29 |
| | | | 707/999.102 |
| 2007/0294268 A1* | 12/2007 | Belyy | G06F 16/258 |
| 2008/0270328 A1* | 10/2008 | Lafferty | E21B 47/00 |
| | | | 702/183 |
| 2009/0031006 A1* | 1/2009 | Johnson | H04M 3/42348 |
| | | | 709/218 |
| 2009/0077008 A1* | 3/2009 | Francis | G06F 16/258 |
| | | | 707/999.102 |
| 2021/0233520 A1* | 7/2021 | Sar Shalom | G06F 40/20 |
| 2022/0036209 A1* | 2/2022 | Horesh | G06N 3/088 |

FOREIGN PATENT DOCUMENTS

WO WO-2007081794 A2 * 7/2007 ....... G06F 17/30241

* cited by examiner

*Primary Examiner* — Dung K Chau
(74) *Attorney, Agent, or Firm* — Schwegman Lundberg & Woessner, P.A.

(57) ABSTRACT

Systems and methods for inferring a schema for a text file are provided. The systems and methods perform operations including: accessing a file comprising a plurality of textual records, each textual record of the plurality of textual records being associated with one or more columns of data; sampling a set of textual records from the plurality of textural records; obtaining a hierarchy comprising a plurality of levels of schema types; determining whether an individual column of the one or more columns of data corresponding to the set of textual records is successfully associated with a first level of the plurality of levels of the schema types and, in response, associating a schema type represented by the first level with the individual column of the one or more columns of data corresponding to the plurality of textual records.

26 Claims, 9 Drawing Sheets

SCHEMA INFERENCE FOR FILES

TECHNICAL FIELD

Embodiments of the disclosure relate generally to data platforms and databases and, more specifically, to managing schemas for text and/or binary files.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The accuracy and efficiency at which various operations can be performed is impacted by the schema associated with various rows/columns of the tables.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
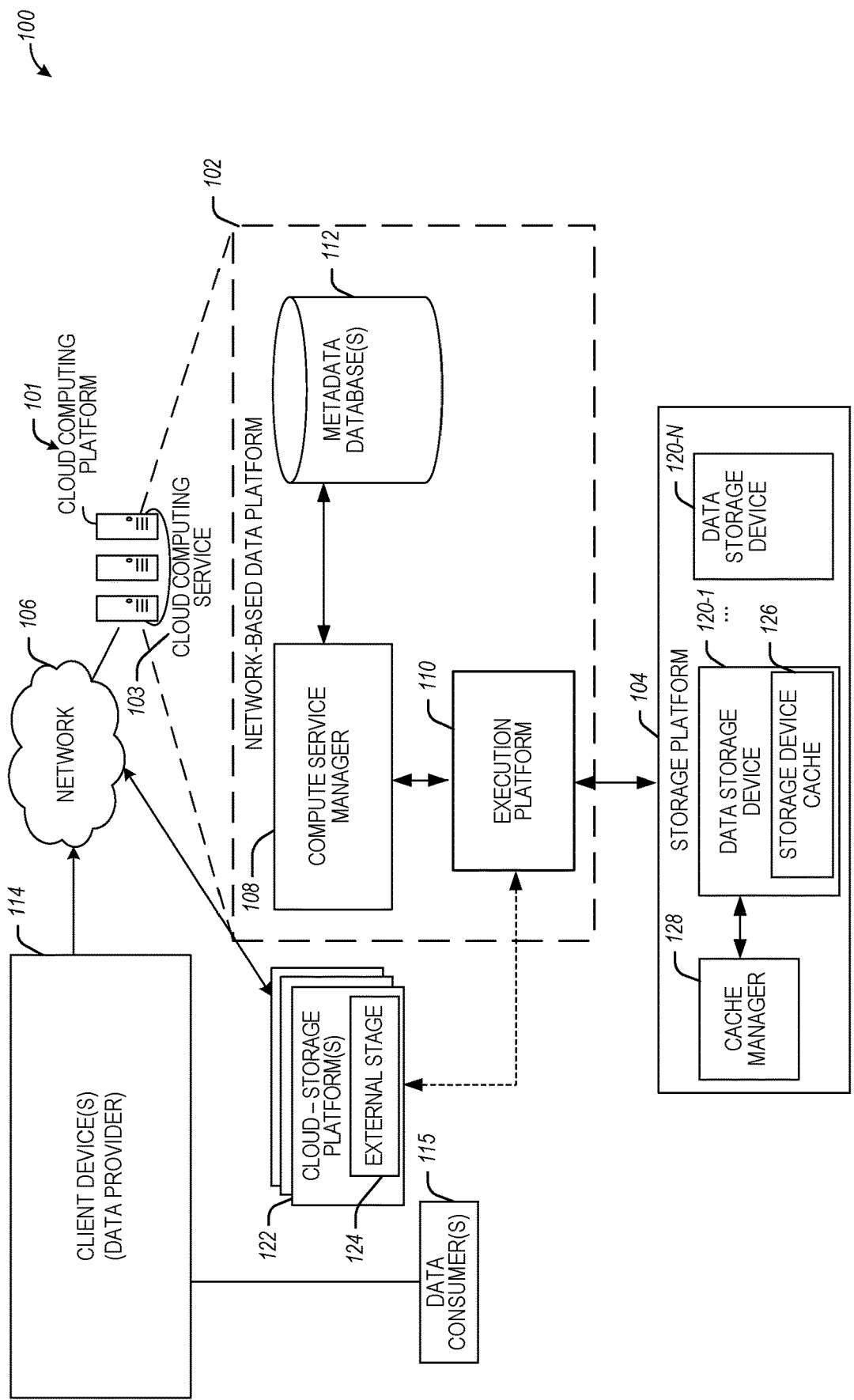
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

In certain systems, the records of a file can be associated with metadata that specifies the schema, category or classification for each column of text. As used herein, the term "schema" or "schema type" refers to a broad categorization, classification, or definition of a set of data (e.g., textual data). The schema type identifies what kind of type of information is represented by the set of data. Typically, a human operator manually reviews or inputs the data into the tables and selects the schema to associate with each column/row. The database system receives the records of the file and can automatically associate the classification or schema with each column of the records based on the previously input or defined or predetermined metadata. The process of manually assigning the classifications is time consuming, inefficient and prone to human error, which can result in waste of time, network and processing device resources.

Aspects of the present disclosure include systems, methods, and devices to address, among other problems, the aforementioned shortcomings of conventional data platforms by automatically inferring a schema for a compression block, binary, or text-based file (e.g., with or without relying or using any metadata associated with such a file). This allows the disclosed techniques to operate on any type of binary or text file, such as JSON, CSV, or XML, file, which does or does not include any predetermined schema definitions or schema metadata and to infer the schema for the textual data of the records in such files. This allows the disclosed techniques to process automatically a larger corpus of files into tabular form, which enhances and broadens the overall use and applicability of the disclosed database system. Also, such text files need not be pre-processed by another component or human into a suitable form before a schema is created automatically which also improves the overall efficiency of the system.

In some examples, the disclosed techniques perform operations for inferring the schema including accessing a file comprising a plurality of textual records, each textual record of the plurality of textual records being associated with one or more columns of data. The disclosed techniques sample a set of textual records from the plurality of textual records and obtain a hierarchy comprising a plurality of levels of schema types. The disclosed techniques determine whether an individual column of the one or more columns of data corresponding to the set of textual records is successfully associated with a first level of the plurality of levels of the schema types. In response to determining that the individual column of the one or more columns of data corresponding to the set of textual records is successfully associated with the first level, the disclosed techniques associate a schema type with the individual column of the one or more columns of data corresponding to the plurality of textual records.

By performing operations for inferring the schema for compression blocks or unclassified textual records in this manner, the data platform increases utilization of execution node processing capability and avoids waste of resources and inefficient use of resources. Specifically, rather than having a human manually process the records and manually assign the classifications or schema which wastes a great deal of time and effort, the inference system can automate this process to improve the overall efficiency of the system. Also, having automated schema inference can standardize the schema across a vast number of files and records which can improve down the line processes and operations performed on the files for which the schema has been standardized.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—e.g., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

Some database operations can include an operation to generate or infer a schema for the records in a textual file. In response to receiving a request for such database operations, the textual file is processed to retrieve the records of the file and generate a table in which data of different columns or rows or fields of the textual file is placed in a corresponding column or row of the table. For example, the textual file can be processed into a standardized format in which a single column of rows is used to represent all of the text in the file where each row can correspond to a separate column of data of the text file. The data of each row of the single column is then sampled to infer a schema of the data in that row, according to the disclosed techniques. The schema can then be added to a schema output table that lists different column identifiers of data of the file as separate rows and associates each column identifier with the inferred schema. The schema output table can then be processed and aggregated, such as to remove and combine duplicate rows into a single row. This way, a column identifier of one row of data in the standardized format that is associated with the same schema type of another column identifier of another row of data is merged into a single column identifier associated with that same schema type. In some cases, multiple files of different types can be processed into the standardized format which is then used to infer the schema type of the data included in the multiple files. The inferred schema type is then output in the schema output table that represents the schemas of all of the input files.

For example, the standardized format of the file can include a set of records each of which includes a first field, first row or first column with respective textual data (e.g., number representing a date). The textual data of the first field, first row or first column of each record is retrieved and sampled to determine or test whether the textual data is successfully mapped with a particular type of schema. In some examples, a first schema type is selected from a hierarchy of schemas or schema types and is used to attempt to categorize or associate the textual data with the first schema type (e.g., a fixed or timestamp schema type). If the textual data is unsuccessfully associated with the first schema type, then the next level of the hierarchy is accessed to obtain a second schema type to use to test the textual data. In response to determining that the textual data is successfully mapped or associated with the second schema type (e.g., a date schema type), the second schema type is associated with the textual data of the first field, first row or first column of each of the records in the file. In such cases, a column identifier of the first field, first row or first column of each of the records in the file is placed in a schema output table and is associated with the schema type for the data.

In some embodiments, a user account object lists users authorized to access at least one target account (e.g., an account of a data provider or data consumer 115). In some embodiments, a roles account object configures privileges for the users to access the at least one target account. In some aspects, a warehouse object indicates compute resources (e.g., at least one virtual warehouse of the execution platform 110) for executing a workload associated with one or more databases of the data provider. In some embodiments, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
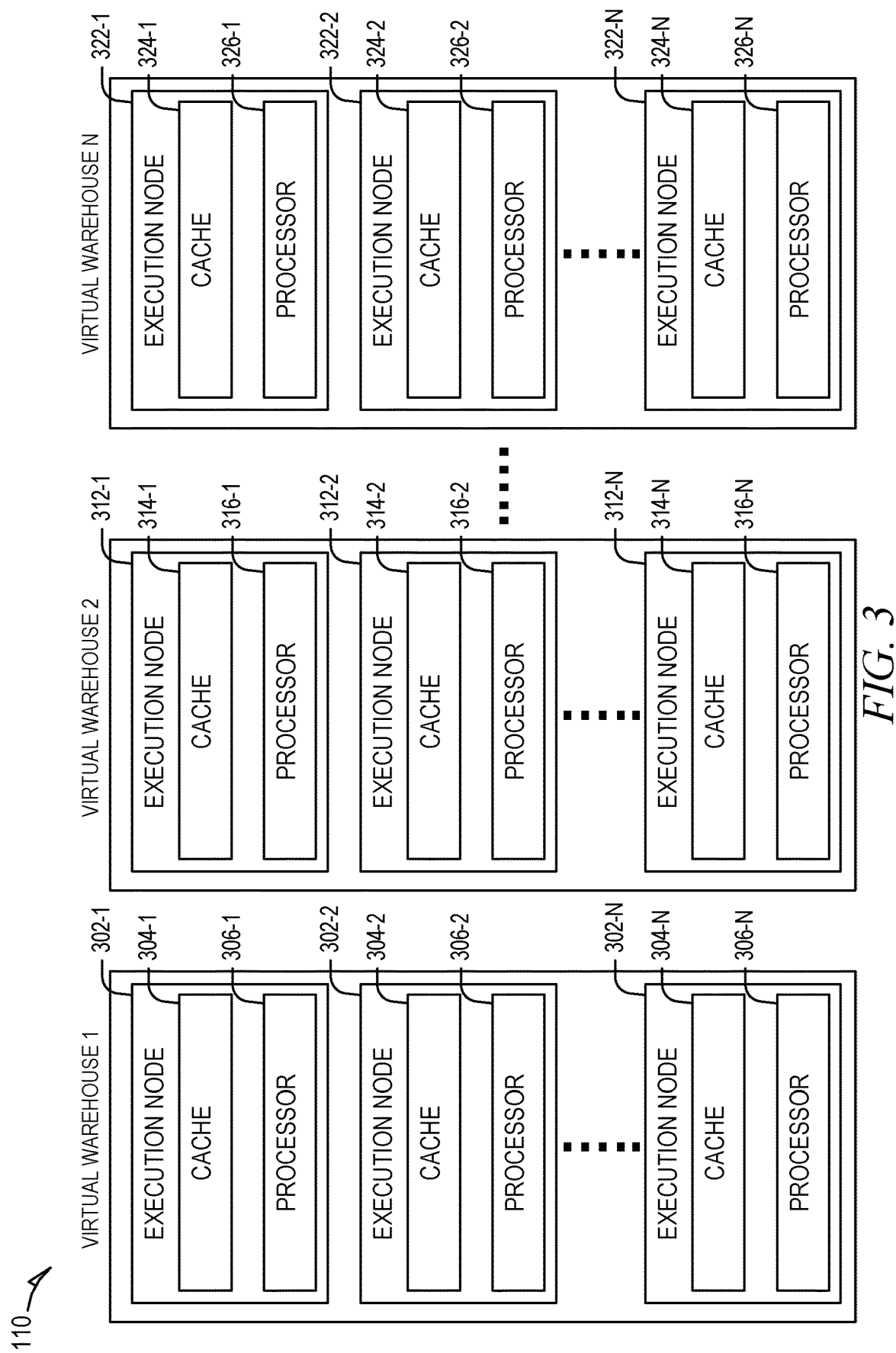
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like.

In some embodiments, at least one storage device cache 126 (e.g., an internal cache) may reside on one or more of the data storage devices 120-1-120-N, and at least one external stage 124 may reside on one or more of the cloud storage platforms 122. In some examples, a single storage device cache 126 can be associated with all of the data storage devices 120-1-120-N so that the single storage device cache 126 is shared by and can store data associated with any one of the data storage devices 120-1-120-N. In some examples, each data storage device data storage devices 120-1-120-N can include or implement a separate storage device cache 126. A cache manager 128 handles the transfer of data from the data storage devices 120-1-120-N to the storage device cache 126. The cache manager 128 handles the eviction of data from the storage device cache 126 to the respective associated data storage devices 120-1-120-N. The storage platform 104 can include one or more hard drives and/or can represent a plurality of hard drives distributed on a plurality of servers in a cloud computing environment.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of subplans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or RAM) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
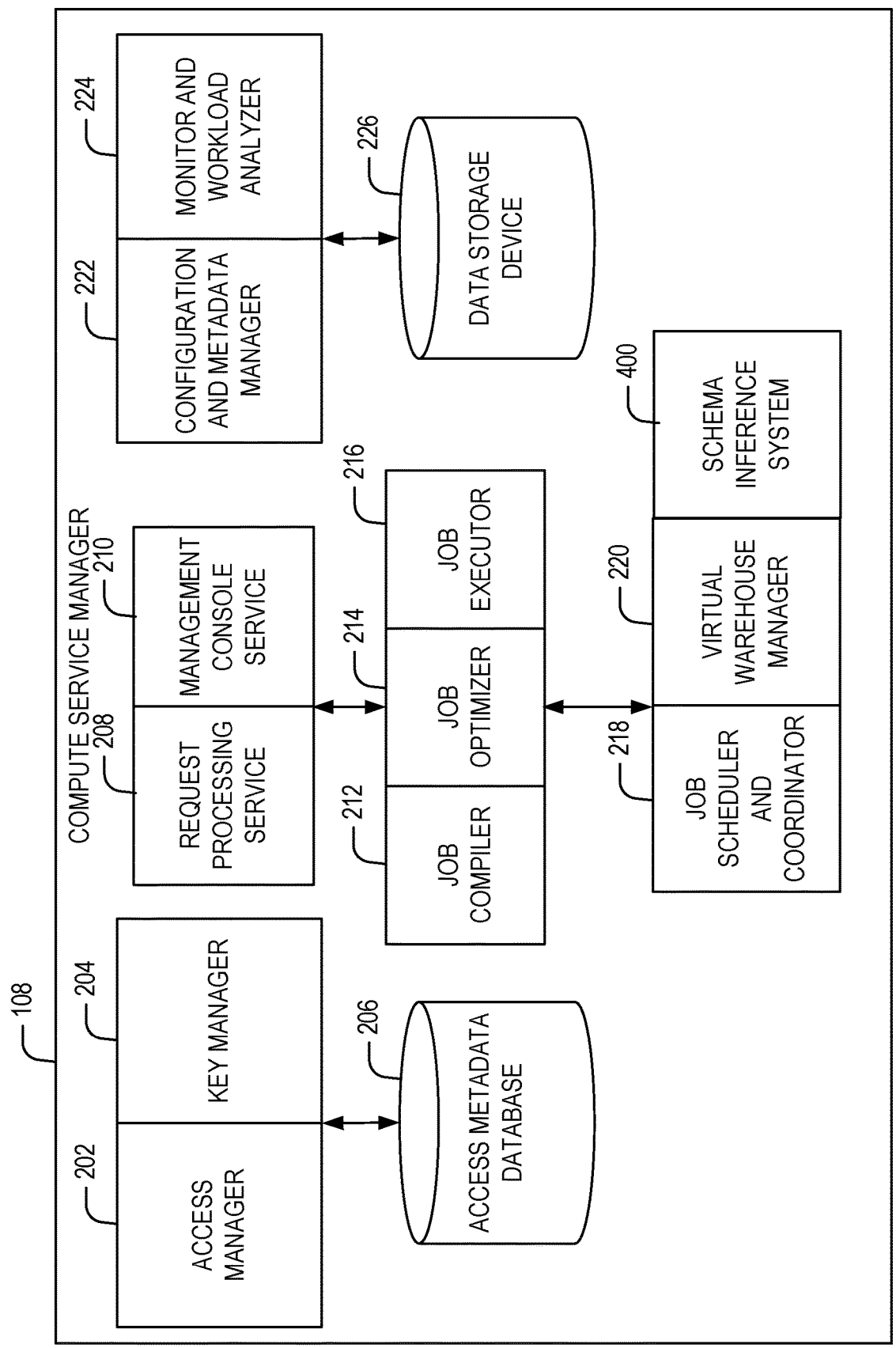
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In some cases, the compute service manager includes a schema inference system 400, discussed in more detail below, to handle jobs of the job executor 216.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, which can be implemented by any of the virtual warehouses of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104. The techniques described with respect to the cache manager 128 of the storage platform 104 (e.g., a HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
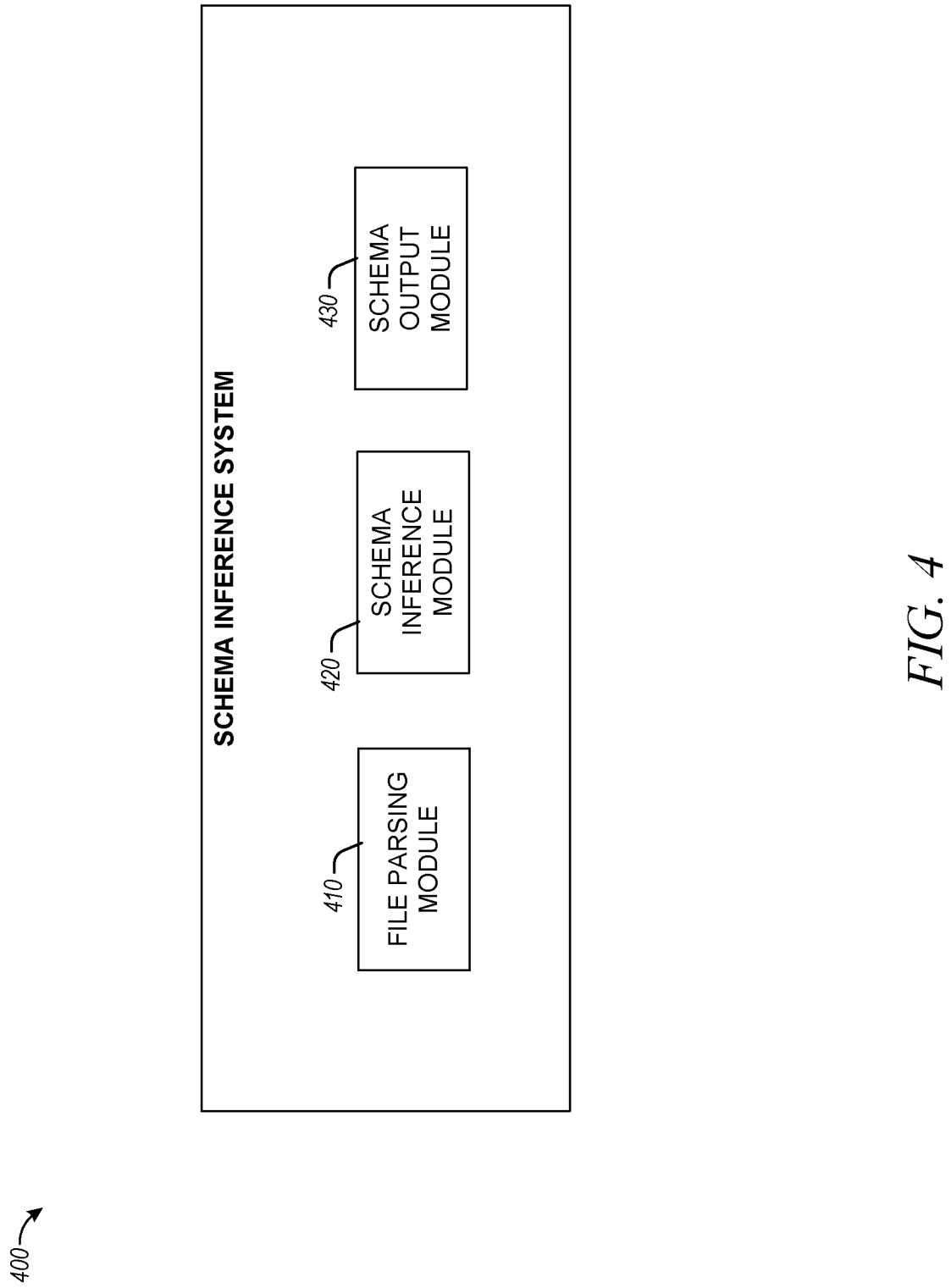
FIG. 4 is a block diagram of schema inference system, in accordance with some embodiments of the present disclosure.

FIG. 4 is a block diagram illustrating an example of the schema inference system 400 which can be implemented by any of the virtual warehouses of the execution platform 110, in accordance with some embodiments of the present disclosure. The schema inference system 400 can include a file parsing module 410, a schema inference module 420, and a schema output module 430. The schema inference system 400 is configured to receive a file of any suitable text format, such as CSV, JSON, and/or XML file format. The schema inference system 400 is configured to generate a table representing the text in the received file and which indicates an automatically inferred schema of each row/column of the table. The schema can be inferred by sampling some (or all) of the fields, columns, and/or rows of the received file.

In some examples, the schema inference system 400 accesses a file including a plurality of textual records, each textual record of the plurality of textual records being associated with one or more columns of data. The schema inference system 400 samples a set of textual records from the plurality of textual records and obtains a hierarchy including a plurality of levels of schema types. The schema inference system 400 determines whether an individual column of the one or more columns of data corresponding to the set of textual records is successfully associated with a first level of the plurality of levels of the schema types. The schema inference system 400, in response to determining that the individual column of the one or more columns of data corresponding to the set of textual records is successfully associated with the first level, associates a schema type with the individual column of the one or more columns of data corresponding to the plurality of textual records.

In some examples, the schema inference system 400, in response to determining that the individual column of the one or more columns of data corresponding to the set of textual records is unsuccessfully associated with the first level, selects a second level of the plurality of levels of the schema types. The schema inference system 400 determines whether the individual column of the one or more columns of data corresponding to the set of textual records is successfully associated with the second level of the plurality of levels of the schema types.

In some examples, the schema inference system 400, in response to determining that the individual column of the one or more columns of data corresponding to the set of textual records is successfully associated with the second level (e.g., a higher or lower level that is more or less descriptive than the first level), associates a schema type represented by the second level with the individual column of the one or more columns of data corresponding to the plurality of textual records. In some examples, the schema inference system 400 accesses a plurality of schema types represented by the first level of the plurality of levels and determines that the individual column of the one or more columns of data corresponding to the set of textual records is successfully associated with a first schema type of the plurality of schema types. In such cases, the schema inference system 400 selects the first schema type as the schema type in response to determining that the individual column of the one or more columns of data corresponding to the set of textual records is successfully associated with the first schema type of the plurality of schema types.

In some examples, the schema inference system 400 accesses a plurality of schema types represented by the first level of the plurality of levels and determines that the individual column of the one or more columns of data corresponding to the set of textual records is unsuccessfully associated with a first schema type of the plurality of schema types. The schema inference system 400, in response to determining that the individual column of the one or more columns of data corresponding to the set of textual records is unsuccessfully associated with the first schema type, selects a second schema type from the plurality of schema types represented by the first level. In some aspects, the schema inference system 400 determines that the individual column of the one or more columns of data corresponding to the set of textual records is successfully associated with the second schema type and selects the second schema type as the schema type in response to determining that the individual column of the one or more columns of data corresponding to the set of textual records is successfully associated with the second schema type.

In some examples, the plurality of schema types includes at least one of a real data type, a date data type, a time data type, or a boolean data type. In some examples, a first level of the plurality of levels represents a first set of schemas and a second level of the plurality of levels represents a second set of schemas. In some examples, the first set of schemas include at least one of a fixed data type or a timestamp data type, and the second set of schemas include at least one of a real data type, a date data type, a time data type, or a boolean data type.

In some examples, the schema inference system 400 receives first data indicating a maximum quantity of textual records to sample. In such cases, the set of textual records is selected based on the first data. In some examples, the schema inference system 400 receives second data indicating a maximum quantity of files to process. In such cases, the file is accessed based on the second data.

In some examples, the schema inference system 400 parses a first text file of a first type to generate a first plurality of rows of text in a standard format and generate a first table comprising a first set of rows representing the one or more columns of data based on the first plurality of rows, wherein each column of the one or more columns in each of the first set of rows is associated with a respectively inferred schema type. The schema inference system 400 can parse a second text file of a second type to generate a second plurality of rows of text in the standard format and generate a second table comprising a second set of rows representing columns of data based on the second plurality of rows, wherein each column in each of the second set of rows is associated with a respectively inferred schema type. The schema inference system 400 can then aggregate the second set of rows in the second table with the first set of rows of the first table based on determining that an identifier of a particular column of the one or more columns matches an identifier of one of the set of columns. For example, the schema inference system 400 can merge duplicate rows of the first and second tables.

In some examples, the schema inference system 400 determines whether the individual column of the one or more columns of data corresponding to the set of textual records is successfully associated with the first level and a second level of the plurality of levels of the schema types. The schema inference system 400 selects, as the schema, an individual schema represented by a third level of the plurality of levels. The individual schema can be configured to broadly represent schemas of the first and second levels.

In some examples, the schema inference system 400 determines that the individual column of the one or more columns of data corresponding to a number of the set of textual records is unsuccessfully associated with the first level. The schema inference system 400 compares the number of the set of textual records that is unsuccessfully associated with the first level with a maximum outliers threshold and selects the schema type to associate with the one or more columns of data corresponding to the plurality of textual records based on a result of comparing the number of the set of textual records that is unsuccessfully associated with the first level with a maximum outliers threshold.

In some examples, the schema inference system 400 determines that the number of the set of textual records that is unsuccessfully associated with the first level fails to transgress the maximum outliers threshold. In response to determining that the number of the set of textual records that is unsuccessfully associated with the first level fails to transgress the maximum outliers threshold, the schema inference system 400 selects the schema type from the first level of the plurality of levels of schema types. In some examples, the schema inference system 400 determines that the number of the set of textual records that is unsuccessfully associated with the first level transgresses the maximum outliers threshold. In response to determining that the number of the set of textual records that is unsuccessfully associated with the first level transgresses the maximum outliers threshold, the schema inference system 400 selects the schema type from a second level of the plurality of levels of schema types. The schema type that is selected can represent schemas of the first and second levels.

The file parsing module 410 can receive one or more files that are in a textual format or binary format, such as from one or more client devices 114 and/or any other system component. The one or more files that are received can include and/or exclude or not contain any metadata that describes the schema of the underlying or textual data included in the file. The one or more files can be in any suitable binary or text format, such as a JSON, CSV, or XML, text file format. The file can include a plurality of records each of which includes textual data organized in one or more rows. While the disclosed examples are discussed with respect to data organized by rows, similar techniques can be applied to data organized by fields, columns, and/or rows. In some cases, the records of the file are processed into a standardized format so that multiple files or different types are identically formatted to contain the same quantity of fields, columns, and/or rows.

Specifically, the file parsing module 410 parses the file and generates one or more rows for the file. In some examples, the file parsing module 410 extracts all of the text from the file and places all the text as individual rows in a single column of a table. The file parsing module 410 can detect delimiters or other identifiers that define the start and end of different records in the file. The file parsing module 410 can start a new row in the single column in response to detection of the delimiters. Namely, the delimiters specify when a new row of data is to be added to the single column in which to include the corresponding data that precedes the delimiter. This creates a map of key-value pairs, such that each row of each record in the file is associated or represented by a key-value pair. Specifically, the record can include many different rows each associated with a different column of data, such as a name field, a timestamp field, a date field, a number field, and so forth. In some cases, the rows of the record can be arbitrary and generically described as column 1, column 2, . . . , and column n. An initial schema table can be formed in which each row is assigned a column identifier with an arbitrary or variant schema type. Namely, the map can include a column 1 field, a column 2 field, . . . , and a column n field each associated with a variant schema type. The data in the different rows can be processed by the file parsing module 410 to then infer a schema type and update the variant schema type with the inferred schema type.

The file parsing module 410 provides the single column, such as the map of the textual file data to the schema inference module 420. The schema inference module 420 processes the rows to infer a schema type for each of the values stored in the row of the single column. Once the schema type is inferred, the map or schema output table is updated to reflect the inferred schema type and associate the schema type with the corresponding column identifier. Specifically, the file parsing module 410 can sample various textual data from each first field (e.g., column 1) of the record to infer a schema for the data stored in the first field or first row of a first record. In such cases, when a set of numbers is stored across multiple rows of a set of records corresponding to a same first column, the schema inference module 420 can associate a particular schema in the schema output table for those sets of numbers, such as a timestamp schema that describes the type of information represented by those numbers.

In some examples, in order to infer the schema (e.g., column types and nullabilities) for a text-based file format, the data is sampled (e.g., parsed and scanned). In some cases, input can be received from the client device 114 along with the file that specifies parameters for sampling the data to infer the schema. In some cases, the file itself can specify the sampling parameters. In some cases, the sampling parameters are not included in the file or received in the request. In such cases, a default sampling parameter can be selected. The default can be set to be all of the records and all of the files that are represented in the single column or can be set to be 75% of the records and all of the files.

The sampling parameter can specify a maximum number of files and/or a maximum number of records to be scanned per file. For example, the schema inference module 420 can randomly or sequentially select or obtain a group of data from a given one of the fields (e.g., each of the data from the column 1 field of the single column, such as each of the data stored in a row of the single column that corresponds to the column 1 field) up to the maximum number of records. In an example, the schema inference module 420 selects randomly or sequentially a set of rows from the single column corresponding to a number of records of the file up to and/or corresponding to the maximum number of records. The number of records in the file can include more than the maximum number of records parameter and, in such cases, less than all of the records of the file represented in the single column of data are used to infer the schema for each column of data in the records.

As a default, the schema inference module 420 can initially assign a string schema type to each of the rows of the map that represents the records of the file. The string schema type can then be updated with a more specific schema type by inferring the schema type from the sampled data. To infer the schema type for a particular set of data of multiple records corresponding to a particular field or column, a specific conversion function can be used. This function is configured to convert a string type of data to another data type, such as timestamp or date. For example, a timestampformatimpl::parse( ) function or method takes a string and returns an error if the string cannot be parsed successfully into the timestamp format. A series of parsing functions can be implemented and executed sequentially or in parallel to identify which of the parsing functions completes or is able to successfully convert the data of the particular field into the corresponding type or schema. In some examples, an in-memory map can be maintained to track the mapping between the column name and the inferred schema or data type.

Figure 5:
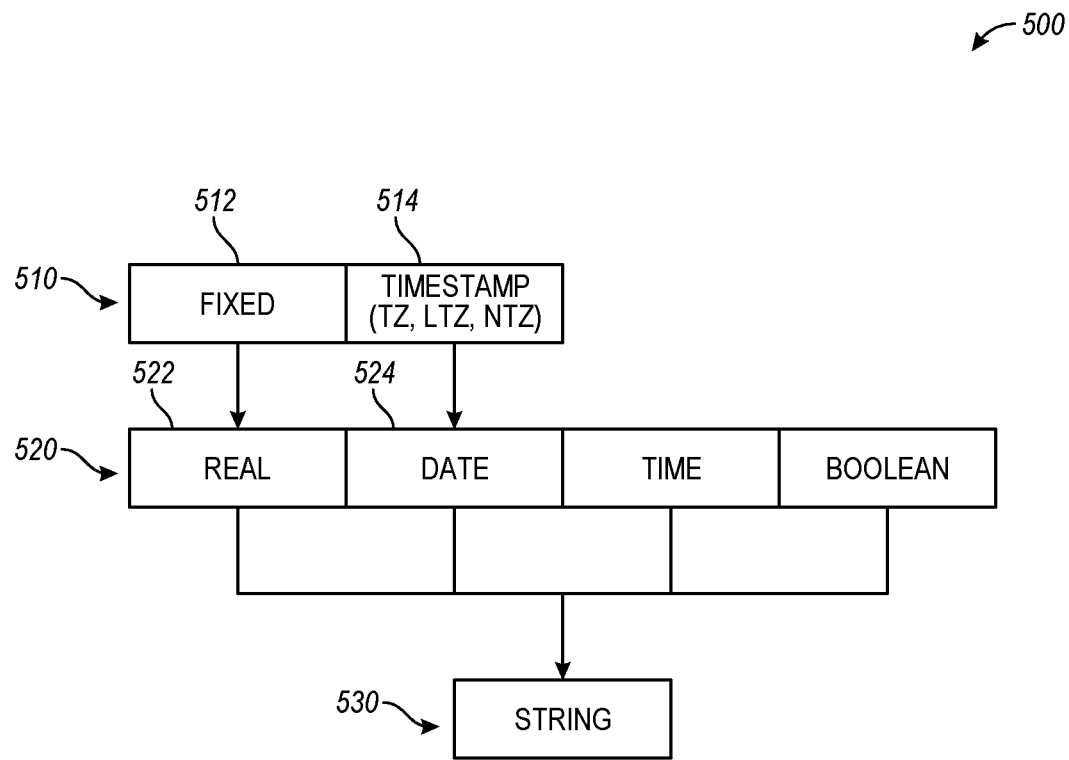
FIG. 5 is an illustrative hierarchy of levels of schema types, in accordance with some embodiments of the present disclosure.

In some cases, the functions are executed according to a predefined hierarchy of different levels of schemas. In an example, schemas that are higher up in the hierarchy than other schemas can describe data with more details. For example, if a string can be converted to a timestamp and time, then the timestamp schema type is selected to describe the string because the timestamp is more descriptive than just the time. The lowest level in the hierarchy can be the default string schema type or variant schema type. FIG. 5 is an illustrative hierarchy 500 of levels of schema types which can be accessed, stored, implemented and/or obtained by the schema inference system 400, in accordance with some embodiments of the present disclosure.

The hierarchy 500 includes a first level 510 of schema types, a second level 520 of schema types, and a third level 530 of schema types. Each level 510, 520, and/or 530 can include one or more different types of schemas. For example, the first level 510 can include a fixed schema type 512 and a timestamp schema type 514 (which can have various time zone parameters, such as TZ, LTZ, NTZ). The second level 520 can include a real schema type 522, a date schema type 524, and one or more other schema types, such as time and boolean. Each schema type in the second level 520 of schema types can broadly represent or describe data of the first level 510. Namely, a date schema type 524 is more broadly descriptive of the timestamp schema type 514 and the fixed schema type 512. The third level 530 can include a string (or default) schema type, which broadly represents all of the schema types in the first level 510 and the second level 520.

In some cases, each schema type if there are multiple in a given level can be assigned a rank or priority. The rank or priority can be used to select one schema type from multiple schema types that are all successfully satisfied or correspond to a field or column of data that is being attempted to be converted. For example, if a column of data is successfully determined to be associated with the real schema type 522 and the date schema type 524, then the priority values associated with each of these schema types can be used to select only one of the schema types to use to represent the data. Namely, if the real schema type 522 is associated with a higher priority value than the date schema type 524 and both are determined to successfully represent a data set or sample, then the real schema type 522 is selected to be associated with the field or column of data because the real schema type 522 is associated with the higher priority value.

In some examples, a column of 0s and 1s can be determined to be of a fixed schema type. Such a column can also be inferred as a boolean schema type, a timestamp schema type, time schema type, or date schema type because such values can be translated into those time-related types. In such cases, only the direct type, which is the fixed schema type, is selected. The boolean and time-related types are all inferred based on the fact that the values are fixed. The string schema type can be the base type that is inferred because all of the data is of a string type for text-based file formats. If a column can be inferred to more than one type excluding the string schema type (e.g., a column that contains the timestamp and the time schema types), then the inferred schema type falls back to the string schema type because of the conflict.

In some cases, for fixed and real schema types, an intersection within a range of precision and scale is used to control the selection of the schema type to associate with the column. When a column or field is unsuccessfully inferred as a fixed schema type (e.g., the values in the column or field cannot be successfully converted to the fixed schema type), the schema inference module 420 infers the real schema type as the selected schema type to associate with the column or field in order to represent wider range of precision and scale.

In some cases, a pair of inclusive types are timestamp and date. A timestamp can be a date and a time with an optional time zone parameter. When downcasting from a timestamp to a date, the time and time zone parameters are excluded or ignored. When casting a date to a timestamp, the time section can be set to 0. When casting a timestamp to a date, the time section can be truncated. In this case, a column with timestamps and dates can be inferred as a date schema type.

In some examples, the schema inference module 420 accesses the text from each first column a sample set of records that is received from the file parsing module 410. The schema inference module 420 attempts to convert the text in each of the first columns into a schema type corresponding to the first level 510. For example, the schema inference module 420 attempts to convert the data into the fixed schema type 512. If the data is unsuccessfully converted to the fixed schema type 512, the schema inference module 420 attempts to convert the data into the timestamp schema type 514. If the data of the sampled set of records is successfully converted to the timestamp schema type 514, the schema inference module 420 associates the timestamp schema type 514 with the first column of each of the records in the file received from the file parsing module 410.

In some cases, the schema inference module 420 determines that the data in the first column is unsuccessfully associated with any of the schema types of the first level 510. In such cases, the schema inference module 420 attempts to convert the text in each of the first columns into a schema type corresponding to the second level 520. For example, the schema inference module 420 attempts to convert the data into the real schema type 522. If the data is unsuccessfully converted to the real schema type 522, the schema inference module 420 attempts to convert the data into the date schema type 524. If the data is successfully converted to the date schema type 524, the schema inference module 420 associates the date schema type 524 with the first column of each of the records in the file received from the file parsing module 410. In some examples, the schema inference module 420 operates on a record-by-record basis and on a row-by-row basis of each record to associate or assign an inferred schema with each row of each record. The associated or assigned schema can be stored as a respective column identifier for the record. In this way, each record that includes multiple rows can be assigned corresponding multiple column identifiers with respectively inferred schemas. After processing multiple records or all of the records to generate the column identifiers and respective schemas, the column identifiers are aggregated (e.g., to remove duplicates and combine column identifiers that correspond to the same column of data and/or to combine or resolve conflict schemas into a particular schema type, such as text or variant). For example, a first record can be associated with a column identifier 1 and column identifier 2 and a second record can be associated with column identifier 1 and column identifier 2. If the column identifier 1 of the first record has a particular schema type inferred for column identifier 1 of the second record, the two column identifiers are merged or aggregated into a single instance of a column identifier 1 associated with the particular schema type in the output provided to the client device 114.

In some cases, the schema inference module 420 can determine that the data in the first column is successfully associated with schema types that are in the first and second levels 510 and 520. In such cases, the schema inference module 420 determines whether the data is successfully associated with the schema of the third level 530. In response to determining that the data is successfully associated with the schema of the third level 530, the schema inference module 420 associates the schema type of the third level 530 with the data in the first column of each of the records in the file received from the file parsing module 410.

In some examples, the schema inference module 420 determines that the first column of a first number of records is successfully associated with a first schema type in the first level 510 and that the first column of a second number of records is unsuccessfully associated with the first schema type in the first level 510. Namely, some of the data in the first column of the sample of records is successfully associated with a first schema type and another portion of the data of the first column of a remaining portion of the sample of records is successfully associated with a second schema type or a schema type in another level of the hierarchy 500. In such cases, the schema inference module 420 calculates how many records are successfully associated with the first schema type and how many records are unsuccessfully associated with the first schema type. The records that are unsuccessfully associated with the first schema type can be referred to as outliers. In some cases, the records that are associated with the minority schema are defined as the outliers.

The schema inference module 420 can obtain a maximum outliers threshold, such as from the client device 114. The schema inference module 420 compares the number of outliers (e.g., quantity of records that are unsuccessfully associated with the first schema type) with the maximum outliers threshold. Namely, the records associated with the majority schema can be used to define the final schema for all of the records. The schema inference module 420 can determine that the number outliers fails to transgress the maximum outliers threshold. In such cases, the schema inference module 420 selects the first schema type to associate with all the records even those that include the outliers. The schema inference module 420 can determine that the number outliers transgresses the maximum outliers threshold. In such cases, the schema inference module 420 selects a schema type from the second level 520 (which broadly categorizes or describes data of the first level 520 including the first schema type) to associate with all the records even though some records include data in the first column that are successfully associated with the first schema type of the first level 510.

Referring back to FIG. 4, the schema inference module 420 provides the single column of data for which the schema has been inferred and added to the single column of data to the schema output module 430. The schema output module 430 can return the single column of data to which the inferred schema has been added back to the client device 114 from which the file was received. Namely, the schema output module 430 returns the schema (e.g., a set of column identifiers associated with corresponding schema types) of the one or more text or binary files received from the client device 114.

Figure 6:
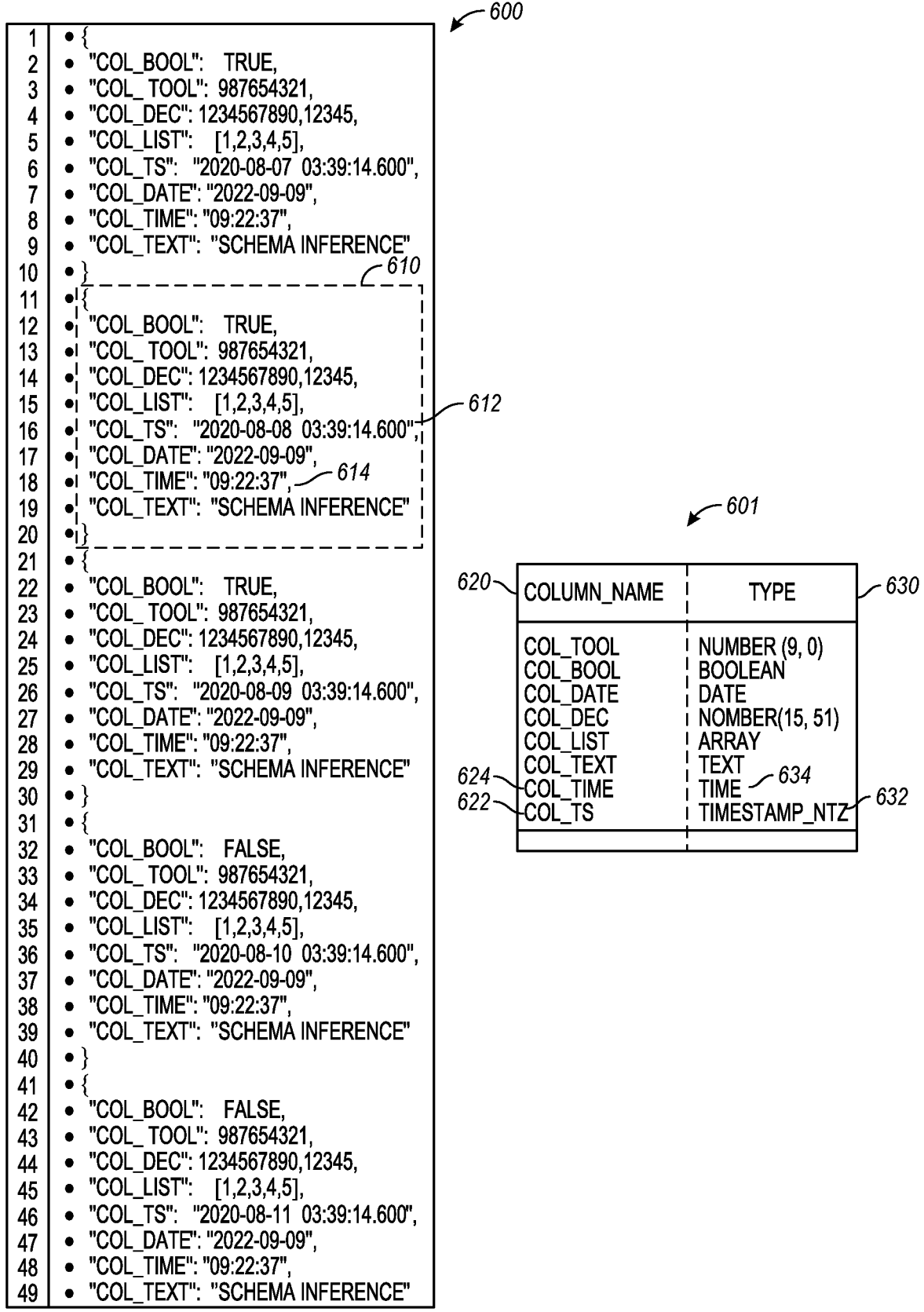
FIG. 6 is an illustrative input and output of the schema inference system, in accordance with some embodiments of the present disclosure.

FIG. 6 is an illustrative input and output of the schema inference system 400, in accordance with some embodiments of the present disclosure. Specifically, the schema inference system 400 can receive an input file 600 that includes multiple records 610. Each record of the records 610 includes a number of fields, rows or columns, such as a first field 612 and a second field 614. The data in the input file 600 does not include any indication or metadata that specifies the schema type of the data included in the records 610.

The schema inference system 400 processes the input file 600 to generate a table 601 in which the different fields of each of the records is tabularized or placed into a corresponding row or column of the table 601. For example, the table can include a column name 620 and a column type 630. Each of the fields 612 and 614 of the records 610 can be represented by a separate entry in the column name 620, such as first entry 624 and second entry 622. The underlying data of the first entry 624 and second entry 622 is associated with the corresponding text of the respective first field 614 and a second field 612 of the file 600. The text associated with a subset of sample of records corresponding to the first entry 624 (or first column, row, or field of an array) can be processed by the schema inference system 400 to infer a schema type of the text. The inferred schema type 634 is then listed or added to the column type 630 in association with the first entry 624. Similarly, the text associated with a subset of sample of records corresponding to the second entry 622 (or second column, row, or field of an array) can be processed by the schema inference system 400 to infer a schema type of the text. The inferred schema type 632 is then listed or added to the column type 630 in association with the second entry 622.

Figure 7A:
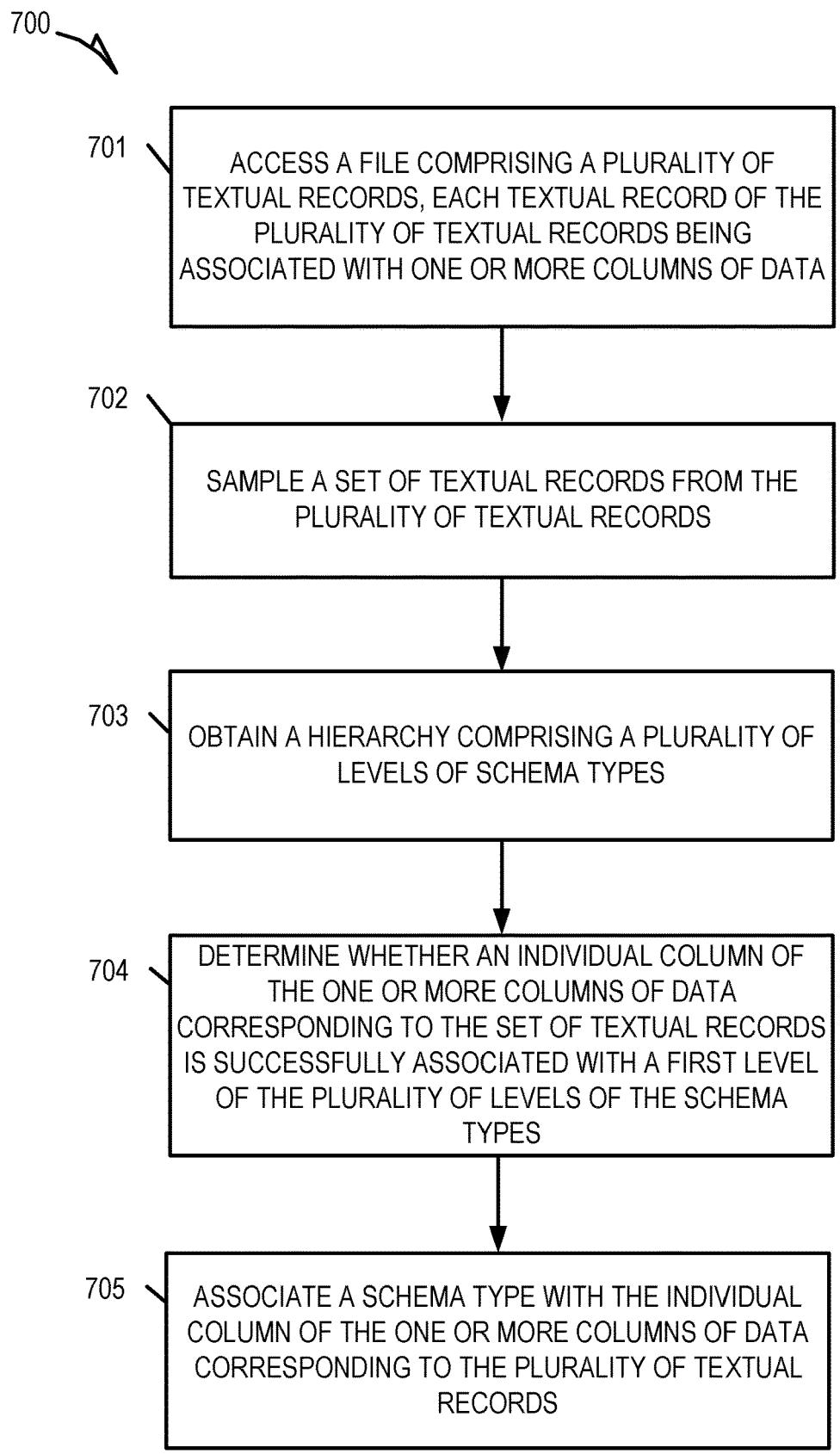
FIGS. 7A and 7B are flow diagrams illustrating operations of the schema inference system, in accordance with some embodiments of the present disclosure.

FIG. 7A is a flow diagram illustrating operations 700 of the schema inference system 400, in accordance with some embodiments of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it shall be appreciated that operations 700 may be deployed on various other hardware configurations and is not intended to be limited to deployment within the data platform 102. Depending on the embodiment, an operation of the operations 700 may be repeated in different ways or involve intervening operations not shown. Though the operations of the operations 700 may be depicted and described in a certain order, the order in which the operations are performed may vary among embodiments, including performing certain operations in parallel or performing sets of operations in separate processes.

At operation 701, the schema inference system 400 accesses a file comprising a plurality of textual records, each textual record of the plurality of textual records being associated with one or more columns of data, as discussed above.

At operation 702, the schema inference system 400 samples a set of textual records from the plurality of textual records, as discussed above.

At operation 703, the schema inference system 400 obtains a hierarchy comprising a plurality of levels of schema types, as discussed above.

At operation 704, the schema inference system 400 determines whether an individual column of the one or more columns of data corresponding to the set of textual records is successfully associated with a first level of the plurality of levels of the schema types, as discussed above.

At operation 705, the schema inference system 400, in response to determining that the individual column of the one or more columns of data corresponding to the set of textual records is successfully associated with the first level, associates a schema type with the individual column of the one or more columns of data corresponding to the plurality of textual records, as discussed above. For example, the schema inference system 400 generates a table that lists the column identifiers and corresponding schema types that have been inferred and aggregated for each row of data in the received text files.

Figure 7B:
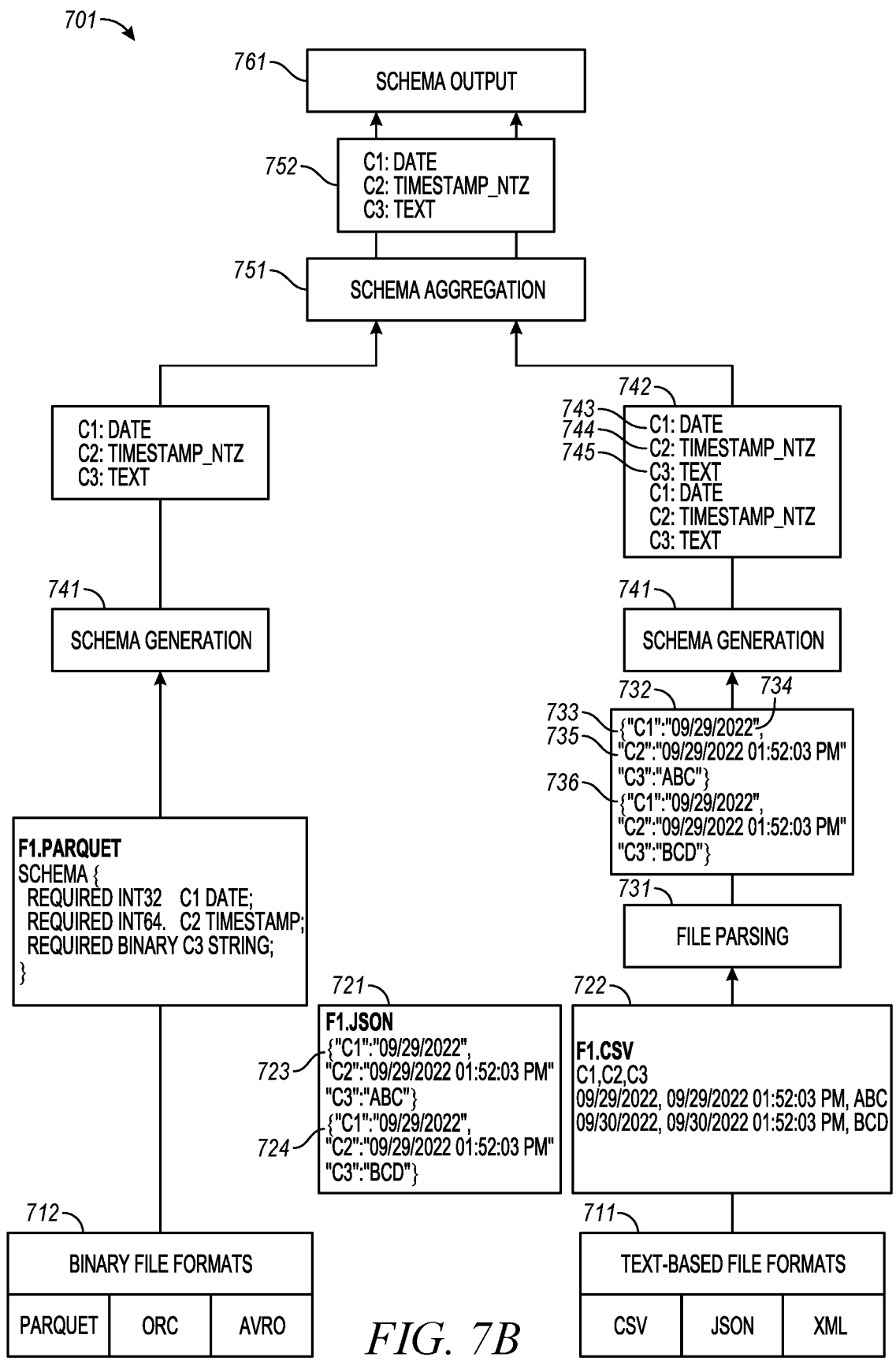

FIG. 7B is a flow diagram illustrating operations 701 of the schema inference system 400, in accordance with some embodiments of the present disclosure. The operations 701 may be embodied in computer-readable instructions for execution by one or more hardware components (e.g., one or more processors) such that the operations of the operations 701 may be performed by components of data platform 102 such as the execution platform 110. Accordingly, the operations 701 is described below, by way of example with reference thereto. However, it shall be appreciated that operations 701 may be deployed on various other hardware configurations and is not intended to be limited to deployment within the data platform 102. Depending on the embodiment, an operation of the operations 701 may be repeated in different ways or involve intervening operations not shown. Though the operations of the operations 701 may be depicted and described in a certain order, the order in which the operations are performed may vary among embodiments, including performing certain operations in parallel or performing sets of operations in separate processes.

At operation 731, one or more text-based files 711 are parsed into a standardized format. For example, a first text-based file 721 (e.g., a JSON file) can be received and parsed, such as by the file parsing module 410. Similarly, a second text-based file 722 (e.g., a CSV file) can be received and parsed, such as by the file parsing module 410. The first text-based file 721 can include a first record 723 and a second record 724. The first record 723 can be associated with or include first, second and third columns of data (e.g., c1, c2, and c3) and the second record 724 can be associated with or include first, second and third columns of data (e.g., c1, c2, and c3). The second text-based file 722 can include the same first and second records 723 and 724 represented in a different format. The file parsing module 410 parses both of the first and second text-based files 721 and 722 into a standardized format 732.

The standardized format 732 can include a single column of data that includes multiple rows each representing a different portion of the records of the first and second text-based files 721 and 722. For example, the standardized format 732 includes a first set of rows 733 corresponding to the first record 723 and a second set of rows 736 corresponding to the second record 724. The first set of rows 733 include a first row 734 representing the first column (c1) of the first record 723 and a second row 735 representing the second column (c2) of the first record 723. The columns of the second record 724 can be similarly represented in the standardized format 732.

After generating the single column of data in the standardized format 732, the schema inference module 420 processes the standardized format 732 to infer the schema at operation 741. For example, the schema inference module 420 samples or selects some or all of the rows of the standardized format 732 and generates a schema output table that includes a column identifier (e.g., c1) and the associated inferred schema for that column identifier. After processing each row or a sampled set of rows of the standardized format 732, the schema output table 742 is generated. The schema output table 742 includes a set of rows each of which identifies a particular column of data of the standardized format 732 and the inferred schema for that column of data.

For example, a first row 743 includes a first column identifier (e.g., C1) and the inferred schema for the data in the first column (e.g., date). Specifically, the schema inference module 420 reads the data in the first row 734 and infers the schema for the data and stores the inferred schema in the first row 743 in association with the first column identifier. Similarly, the schema inference module 420 reads the data in the second row 735 and infers the schema (e.g., timestamp) for the data and stores the inferred schema in the second row 744 in association with the second column identifier (e.g., C2). The schema inference module 420 reads data from the row 736 corresponding to the second record 724 and similarly associates the inferred schema with the corresponding column identifier 745 of that row 736 (e.g., C1).

After processing some or all of the rows from the standardized format 732, the schema inference module 420 performs a schema aggregation operation 751 which aggregates and removes duplicate entries or rows from the schema output table 742. This results in the generation of the aggregated schema output table 752. For example, the schema inference module 420 can determine that the first column identifier of the first row 743 matches the column identifier 745 of another row in the schema output table 742. The schema inference module 420 can also determine that both column identifiers are associated with the same schema (e.g., date). In response, the schema inference module 420 removes the duplicate occurrence of the column identifier with the same schema from the schema output table 742. In some cases, the schema inference module 420 determines that two column identifiers have matching names (e.g., C1 of a first row 743 and C1 of another row in the schema output table 742). The schema inference module 420 can also determine that the two column identifiers are associated with different schemas (e.g., the first row 743 is associated with a date schema and the other row is associated with a time schema). In such cases, the schema inference module 420 stores a single column identifier to represent both instances of the column identifiers of C1 and associates a schema of a lower level in the hierarchy, such as string, to represent both the date and the time schema as part of the schema aggregation operation 751. The aggregated schema output table 752 is then output and transmitted by the schema output operation 761 to the client device 114.

In some cases, a binary file 712 is received in which different rows of data are associated with metadata that describes or defines the schema of the data. In such cases, the binary file 712 is processed by the operation 741 to generate the schema table using the metadata. A similar schema aggregation operation 751 is performed to remove duplicate entries and generate the aggregated schema output table 752.

Described implementations of the subject matter can include one or more features, alone or in combination as illustrated below by way of example.

Example 1: A system comprising: at least one hardware processor; and at least one memory storing instructions that cause the at least one hardware processor to execute operations comprising: accessing a file comprising a plurality of textual records, each textual record of the plurality of textual records being associated with one or more columns of data; sampling a set of textual records from the plurality of textual records; obtaining a hierarchy comprising a plurality of levels of schema types; determining whether an individual column of the one or more columns of data corresponding to the set of textual records is successfully associated with a first level of the plurality of levels of the schema types; and in response to determining that the individual column of the one or more columns of data corresponding to the set of textual records is successfully associated with the first level, associating a schema type with the individual column of the one or more columns of data corresponding to the plurality of textual records.

Example 2: The system of example 1, wherein the operations comprise: in response to determining that the individual column of the one or more columns of data corresponding to the set of textual records is unsuccessfully associated with the first level: selecting a second level of the plurality of levels of the schema types; and determining whether the individual column of the one or more columns of data corresponding to the set of textual records is successfully associated with the second level of the plurality of levels of the schema types.

Example 3: The system of example 2, wherein the operations comprise: in response to determining that the individual column of the one or more columns of data corresponding to the set of textual records is successfully associated with the second level, associating a schema type represented by the second level with the individual column of the one or more columns of data corresponding to the plurality of textual records.

Example 4: The system of any one of examples 1-3, wherein the operations comprise: accessing a plurality of schema types represented by the first level of the plurality of levels; determining that the individual column of the one or more columns of data corresponding to the set of textual records is successfully associated with a first schema type of the plurality of schema types; and selecting the first schema type as the schema type in response to determining that the individual column of the one or more columns of data corresponding to the set of textual records is successfully associated with the first schema type of the plurality of schema types.

Example 5: The system of any one of examples 1-4, wherein the operations comprise: accessing a plurality of schema types represented by the first level of the plurality of levels; determining that the individual column of the one or more columns of data corresponding to the set of textual records is unsuccessfully associated with a first schema type of the plurality of schema types; and in response to determining that the individual column of the one or more columns of data corresponding to the set of textual records is unsuccessfully associated with the first schema type, selecting a second schema type from the plurality of schema types represented by the first level.

Example 6: The system of example 5, wherein the operations comprise: determining that the individual column of the one or more columns of data corresponding to the set of textual records is successfully associated with the second schema type; and selecting the second schema type as the schema type in response to determining that the individual column of the one or more columns of data corresponding to the set of textual records is successfully associated with the second schema type.

Example 7: The system of example 5 or 6, wherein the plurality of schema types comprises at least one of a real data type, a date data type, a time data type, or a Boolean data type.

Example 8: The system of any one of examples 1-7, wherein a first level of the plurality of levels represents a first set of schemas, and wherein a second level of the plurality of levels represents a second set of schemas.

Example 9: The system of example 8, wherein the first set of schemas comprise at least one of a fixed data type or a timestamp data type, and wherein the second set of schemas comprise at least one of a real data type, a date data type, a time data type, or a Boolean data type.

Example 10: The system of any one of examples 1-8, wherein the operations comprise: receiving first data indicating a maximum quantity of textual records to sample, wherein the set of textual records is selected based on the first data.

Example 11: The system of example 10, wherein the operations comprise: receiving second data indicating a maximum quantity of files to process, wherein the file is accessed based on the second data.

Example 12: The system of any one of examples 1-11, wherein the operations comprise: parsing a first text file of a first type to generate a first plurality of rows of text in a standard format; and generating a first table comprising a first set of rows representing the one or more columns of data based on the first plurality of rows, wherein each column of the one or more columns in each of the first set of rows is associated with a respectively inferred schema type.

Example 13: The system of example 12, wherein the operations comprise: parsing a second text file of a second type to generate a second plurality of rows of text in the standard format; generating a second table comprising a second set of rows representing columns of data based on the second plurality of rows, wherein each column in each of the second set of rows is associated with a respectively inferred schema type; and aggregating the second set of rows in the second table with the first set of rows of the first table based on determining that an identifier of a particular column of the one or more columns matches an identifier of one of the set of columns.

Example 14: The system of any one of examples 1-13, wherein the operations comprise: determining whether the individual column of the one or more columns of data corresponding to the set of textual records is successfully associated with the first level and a second level of the plurality of levels of the schema types; and selecting, as the schema, an individual schema represented by a third level of the plurality of levels, wherein the individual schema is configured to broadly represent schemas of the first and second levels.

Example 15: The system of any one of examples 1-14, wherein the operations comprise: determining that the individual column of the one or more columns of data corresponding to a number of the set of textual records is unsuccessfully associated with the first level; comparing the number of the set of textual records that is unsuccessfully associated with the first level with a maximum outliers threshold; and selecting the schema type to associate with the one or more columns of data corresponding to the plurality of textual records based on a result of comparing the number of the set of textual records that is unsuccessfully associated with the first level with a maximum outliers threshold.

Example 16: The system of example 15, wherein the operations comprise: determining that the number of the set of textual records that is unsuccessfully associated with the first level fails to transgress the maximum outliers threshold; and in response to determining that the number of the set of textual records that is unsuccessfully associated with the first level fails to transgress the maximum outliers threshold, selecting the schema type from the first level of the plurality of levels of schema types.

Example 17: The system of example 15 or 16, wherein the operations comprise: determining that the number of the set of textual records that is unsuccessfully associated with the first level transgresses the maximum outliers threshold; and in response to determining that the number of the set of textual records that is unsuccessfully associated with the first level transgresses the maximum outliers threshold, selecting the schema type from a second level of the plurality of levels of schema types, the schema type that is selected represents schemas of the first and second levels.

Figure 8:
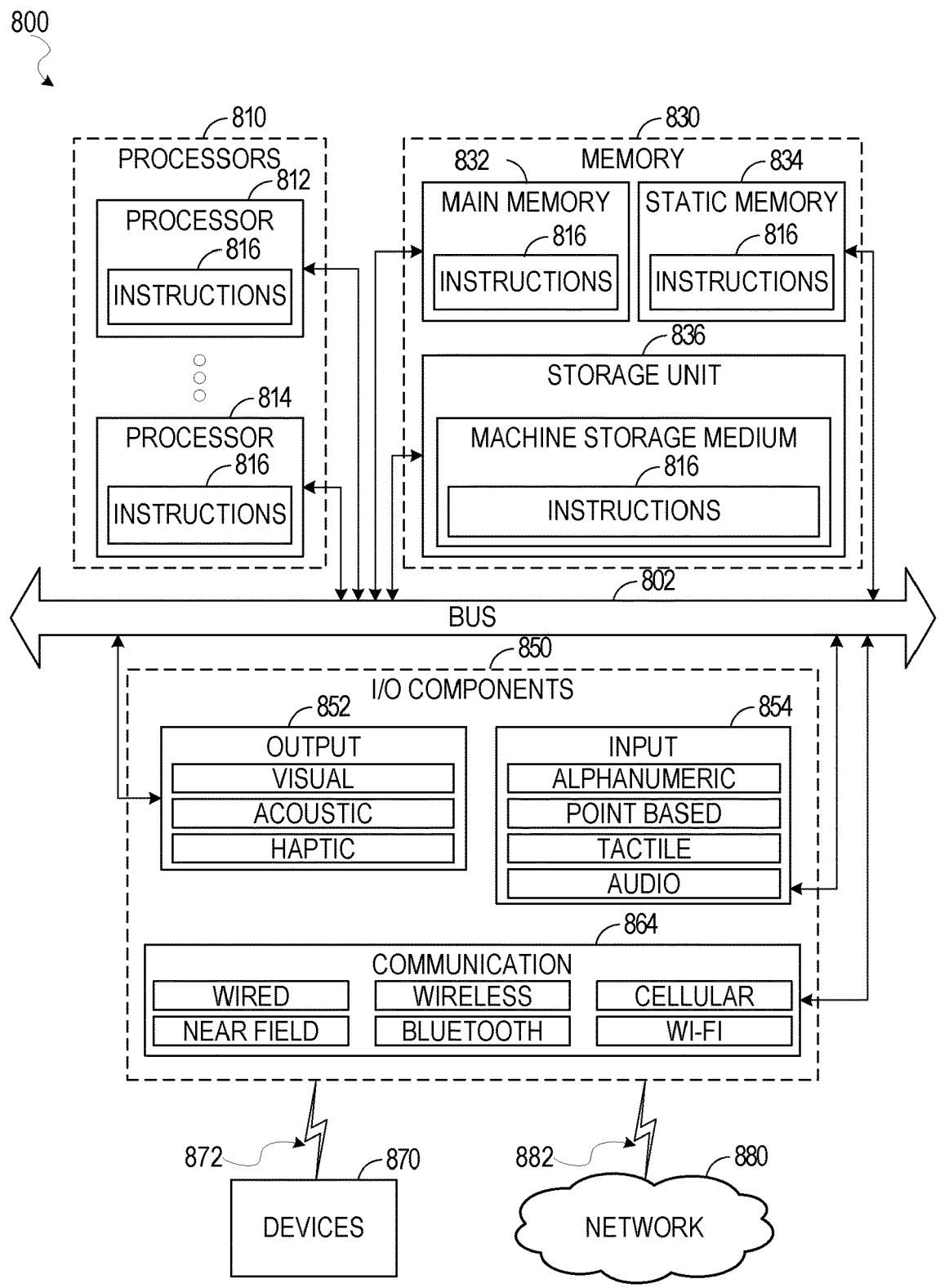
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter.

Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to execute operations comprising:
   accessing a file comprising a plurality of textual records, each textual record of the plurality of textual records being associated with one or more columns of data;
   sampling a set of textual records from the plurality of textual records;
   obtaining a hierarchy comprising a plurality of levels of schema types;
   determining whether an individual column of the one or more columns of data corresponding to the set of textual records is successfully associated with a first level of the plurality of levels of the schema types;
   in response to determining that the individual column of the one or more columns of data corresponding to the set of textual records is successfully associated with the first level, associating a schema type with the individual column of the one or more columns of data corresponding to the plurality of textual records; and
   in response to determining that the individual column of the one or more columns of data corresponding to the set of textual records is unsucessfully associated with the first level;
   selecting a second level of the plurality of levels of the schema types; and
   determining whether the individual column of the one or more columns of data corresponding to the set of textual records is successfully associated with the second level of the plurality of levels of the schema types.

2. The system of claim 1, wherein the operations comprise: in response to determining that the individual column of the one or more columns of data corresponding to the set of textual records is successfully associated with the second level, associating the schema type represented by the second level with the individual column of the one or more columns of data corresponding to the plurality of textual records.

3. The system of claim 1, wherein the operations comprise:
   accessing a plurality of schema types represented by the first level of the plurality of levels;
   determining that the individual column of the one or more columns of data corresponding to the set of textual records is successfully associated with a first schema type of the plurality of schema types; and
   selecting the first schema type as the schema type in response to determining that the individual column of the one or more columns of data corresponding to the set of textual records is successfully associated with the first schema type of the plurality of schema types.

4. The system of claim 1, wherein the operations comprise:
   accessing a plurality of schema types represented by the first level of the plurality of levels;
   determining that the individual column of the one or more columns of data corresponding to the set of textual records is unsuccessfully associated with a first schema type of the plurality of schema types; and
   in response to determining that the individual column of the one or more columns of data corresponding to the set of textual records is unsuccessfully associated with the first schema type, selecting a second schema type from the plurality of schema types represented by the first level.

5. The system of claim 4, wherein the operations comprise:
   determining that the individual column of the one or more columns of data corresponding to the set of textual records is successfully associated with the second schema type; and
   selecting the second schema type as the schema type in response to determining that the individual column of the one or more columns of data corresponding to the set of textual records is successfully associated with the second schema type.

6. The system of claim 4, wherein the plurality of schema types comprises at least one of a real data type, a date data type, a time data type, or a Boolean data type.

7. The system of claim 1, wherein a first level of the plurality of levels represents a first set of schemas, and wherein a second level of the plurality of levels represents a second set of schemas.

8. The system of claim 7, wherein the first set of schemas comprise at least one of a fixed data type or a timestamp data type, and wherein the second set of schemas comprise at least one of a real data type, a date data type, a time data type, or a Boolean data type.

9. The system of claim 1, wherein the operations comprise:
receiving first data indicating a maximum quantity of textual records to sample, wherein the set of textual records is selected based on the first data.

10. The system of claim 9, wherein the operations comprise:
receiving second data indicating a maximum quantity of files to process, wherein the file is accessed based on the second data.

11. The system of claim 1, wherein the operations comprise:
parsing a first text file of a first type to generate a first plurality of rows of text in a standard format; and
generating a first table comprising a first set of rows representing the one or more columns of data based on the first plurality of rows, wherein each column of the one or more columns in each of the first set of rows is associated with a respectively inferred schema type.

12. The system of claim 11, wherein the operations comprise:
parsing a second text file of a second type to generate a second plurality of rows of text in the standard format;
generating a second table comprising a second set of rows representing columns of data based on the second plurality of rows, wherein each column in each of the second set of rows is associated with a respectively inferred schema type; and
aggregating the second set of rows in the second table with the first set of rows of the first table based on determining that an identifier of a particular column of the one or more columns matches an identifier of one of the set of columns.

13. The system of claim 1, wherein the operations comprise:
determining whether the individual column of the one or more columns of data corresponding to the set of textual records is successfully associated with the first level and a second level of the plurality of levels of the schema types; and
selecting, as the schema, an individual schema represented by a third level of the plurality of levels, wherein the individual schema is configured to broadly represent schemas of the first and second levels.

14. The system of claim 1, wherein the operations comprise:
determining that the individual column of the one or more columns of data corresponding to a number of the set of textual records is unsuccessfully associated with the first level;
comparing the number of the set of textual records that is unsuccessfully associated with the first level with a maximum outliers threshold; and
selecting the schema type to associate with the one or more columns of data corresponding to the plurality of textual records based on a result of comparing the number of the set of textual records that is unsuccessfully associated with the first level with a maximum outliers threshold.

15. The system of claim 14, wherein the operations comprise:
determining that the number of the set of textual records that is unsuccessfully associated with the first level fails to transgress the maximum outliers threshold; and
in response to determining that the number of the set of textual records that is unsuccessfully associated with the first level fails to transgress the maximum outliers threshold, selecting the schema type from the first level of the plurality of levels of schema types.

16. The system of claim 14, wherein the operations comprise:
determining that the number of the set of textual records that is unsuccessfully associated with the first level transgresses the maximum outliers threshold; and
in response to determining that the number of the set of textual records that is unsuccessfully associated with the first level transgresses the maximum outliers threshold, selecting the schema type from a second level of the plurality of levels of schema types, the schema type that is selected represents schemas of the first and second levels.

17. A method comprising:
accessing a file comprising a plurality of textual records, each textual record of the plurality of textual records being associated with one or more columns of data;
sampling a set of textual records from the plurality of textual records;
obtaining a hierarchy comprising a plurality of levels of schema types;
determining whether an individual column of the one or more columns of data corresponding to the set of textual records is successfully associated with a first level of the plurality of levels of the schema types;
in response to determining that the individual column of the one or more columns of data corresponding to the set of textual records is successfully associated with the first level, associating a schema type with the individual column of the one or more columns of data corresponding to the plurality of textual records; and
in response to determining that the individual column of the one or more columns of data corresponding to the set of textual records is uncussessfully associated with the first level;
selecting a second level of the plurality of levels of the schema types; and
determining whether the individual column of the one or more columns of data corresponding to the set of textual records is successfully associated with the second level of the plurality of levels of the schema types.

18. The method of claim 17, further comprising: in response to determining that the individual column of the one or more columns of data corresponding to the set of textual records is successfully associated with the second level, associating a schema type represented by the second level with the individual column of the one or more columns of data corresponding to the plurality of textual records.

19. The method of claim 17, further comprising:
accessing a plurality of schema types represented by the first level of the plurality of levels;
determining that the individual column of the one or more columns of data corresponding to the set of textual records is successfully associated with a first schema type of the plurality of schema types; and
selecting the first schema type as the schema type in response to determining that the individual column of the one or more columns of data corresponding to the set of textual records is successfully associated with the first schema type of the plurality of schema types.

20. The method of claim 17, further comprising:
accessing a plurality of schema types represented by the first level of the plurality of levels;
determining that the individual column of the one or more columns of data corresponding to the set of textual records is unsuccessfully associated with a first schema type of the plurality of schema types; and
in response to determining that the individual column of the one or more columns of data corresponding to the set of textual records is unsuccessfully associated with the first schema type, selecting a second schema type from the plurality of schema types represented by the first level.

21. The method of claim 20, further comprising:
determining that the individual column of the one or more columns of data corresponding to the set of textual records is successfully associated with the second schema type; and
selecting the second schema type as the schema type in response to determining that the individual column of the one or more columns of data corresponding to the set of textual records is successfully associated with the second schema type.

22. A non-transitory computer-storage medium comprising instructions that, when executed by a processor of a machine, configure the machine to perform operations comprising:
accessing a file comprising a plurality of textual records, each textual record of the plurality of textual records being associated with one or more columns of data;
sampling a set of textual records from the plurality of textual records;
obtaining a hierarchy comprising a plurality of levels of schema types;
determining whether an individual column of the one or more columns of data corresponding to the set of textual records is successfully associated with a first level of the plurality of levels of the schema types;
in response to determining that the individual column of the one or more columns of data corresponding to the set of textual records is successfully associated with the first level, associating a schema type with the individual column of the one or more columns of data corresponding to the plurality of textual records; and
in response to determining that the individual column of the one or more columns of data corresponding to the set of textual records is unsuccessfully associaated with the first level;
selecting a second level of the plurality of levels of the schema types; and
determining whether the individual column of the one or more columns of data corresponding to the set of textual records is successfully associated with the second level of the pluraity of levels of the schema types.

23. The non-transitory computer-storage medium of claim 22, wherein the operations comprise:
in response to determining that the individual column of the one or more columns of data corresponding to the set of textual records is successfully associated with the second level, associating a schema type represented by the second level with the individual column of the one or more columns of data corresponding to the plurality of textual records.

24. The non-transitory computer-storage medium of claim 22, wherein the operations comprise:
accessing a plurality of schema types represented by the first level of the plurality of levels;
determining that the individual column of the one or more columns of data corresponding to the set of textual records is successfully associated with a first schema type of the plurality of schema types; and
selecting the first schema type as the schema type in response to determining that the individual column of the one or more columns of data corresponding to the set of textual records is successfully associated with the first schema type of the plurality of schema types.

25. The non-transitory computer-storage medium of claim 22, wherein the operations comprise:
accessing a plurality of schema types represented by the first level of the plurality of levels;
determining that the individual column of the one or more columns of data corresponding to the set of textual records is unsuccessfully associated with a first schema type of the plurality of schema types; and
in response to determining that the individual column of the one or more columns of data corresponding to the set of textual records is unsuccessfully associated with the first schema type, selecting a second schema type from the plurality of schema types represented by the first level.

26. The non-transitory computer-storage medium of claim 25, wherein the operations comprise:
determining that the individual column of the one or more columns of data corresponding to the set of textual records is successfully associated with the second schema type; and
selecting the second schema type as the schema type in response to determining that the individual column of the one or more columns of data corresponding to the set of textual records is successfully associated with the second schema type.

* * * * *

UNITED STATES PATENT AND TRADEMARK OFFICE
CERTIFICATE OF CORRECTION

| | |
|---|---|
| PATENT NO. | : 11,599,512 B1 |
| APPLICATION NO. | : 17/938401 |
| DATED | : March 7, 2023 |
| INVENTOR(S) | : Yucan Liu |

It is certified that error appears in the above-identified patent and that said Letters Patent is hereby corrected as shown below:

On the Title Page

Item (57), in "Abstract", in Column 2, Line 7, delete "textural" and insert --textual-- therefor In the Claims In Column 30, Line 6, in Claim 1, delete "unsucessfully" and insert --unsuccessfully-- therefor In Column 30, Line 7, in Claim 1, delete "level;" and insert --level:-- therefor In Column 30, Lines 16-17, in Claim 2, after "comprise:", insert a linebreak In Column 32, Line 43, in Claim 17, delete "uncussessfully" and insert --unsuccessfully-- therefor In Column 32, Line 44, in Claim 17, delete "level;" and insert --level:-- therefor In Column 32, Line 51, in Claim 18, after "comprising:", insert a linebreak In Column 33, Line 49, in Claim 22, delete "associaated" and insert --associated-- therefor In Column 33, Line 50, in Claim 22, delete "level;" and insert --level:-- therefor In Column 34, Line 4, in Claim 22, delete "pluraity" and insert --plurality-- therefor Signed and Sealed this
Twenty-eighth Day of May, 2024

Katherine Kelly Vidal
*Director of the United States Patent and Trademark Office*